United States Patent
Fron et al.

(10) Patent No.: US 9,124,323 B2
(45) Date of Patent: Sep. 1, 2015

(54) INTERFERENCE REDUCTION METHOD

(71) Applicant: SEQUANS COMMUNICATIONS, Colombes (FR)

(72) Inventors: Gregory Fron, Coubert (FR); David Choukroun, Saint Mande (FR)

(73) Assignee: Sequans Communications, Puteaux (FR)

( * ) Notice: Subject to any disclaimer, the term of this patent is extended or adjusted under 35 U.S.C. 154(b) by 0 days.

(21) Appl. No.: 13/911,691

(22) Filed: Jun. 6, 2013

(65) Prior Publication Data

US 2013/0331045 A1 Dec. 12, 2013

(30) Foreign Application Priority Data

Jun. 6, 2012 (EP) .................................... 12305642

(51) Int. Cl.
*H04B 1/04* (2006.01)
*H04B 15/00* (2006.01)
*H04W 16/14* (2009.01)
*H04W 88/10* (2009.01)

(52) U.S. Cl.
CPC .............. *H04B 1/0475* (2013.01); *H04B 15/00* (2013.01); *H04M 2250/06* (2013.01); *H04W 16/14* (2013.01); *H04W 88/10* (2013.01)

(58) Field of Classification Search
CPC ................. H04B 1/0475; H04B 1/525; H04B 2001/0416; H04B 17/0025; H03F 1/3247; H03F 1/32; H03F 1/3294; H03G 3/3042; H03G 3/3047

USPC ........... 455/63.1, 67.11, 67.13, 114.2, 115.1, 455/500, 501, 507–509, 550.1

See application file for complete search history.

(56) References Cited

U.S. PATENT DOCUMENTS

| 2007/0033618 A1* | 2/2007 | Kiukkonen et al. ............. 725/62 |
| 2012/0106472 A1* | 5/2012 | Rosa et al. ..................... 370/329 |
| 2013/0044621 A1* | 2/2013 | Jung et al. ...................... 370/252 |
| 2013/0324113 A1* | 12/2013 | Jechoux et al. ............. 455/426.1 |

FOREIGN PATENT DOCUMENTS

| EP | 0838964 A2 | 4/1998 |
| WO | 2011/053887 A1 | 5/2011 |
| WO | 2012/024422 A1 | 2/2012 |

OTHER PUBLICATIONS

European Search Report and Written Opinion dated Jan. 17, 2013 for corresponding European Patent Application No. 12305642, filed Jun. 6, 2012.

* cited by examiner

*Primary Examiner* — Nhan Le
(74) *Attorney, Agent, or Firm* — David D. Brush; Westman, Champlin & Koehler, P.A.

(57) ABSTRACT

A method for calibrating signal transmission equipment. The equipment includes at least two signal transmission subsystems, a first subsystem implementing a first signal transmission technology and a second subsystem implementing a second signal transmission technology. The method includes transmitting, by the first subsystem, a signal at a predetermined transmission power; measuring, by the second subsystem, an amount of noise perceived on at least one channel associated with the second subsystem; and recording, in a data structure, the amount of noise for the at least one associated channel.

5 Claims, 2 Drawing Sheets

INTERFERENCE REDUCTION METHOD

1. FIELD OF THE INVENTION

Figure 1:
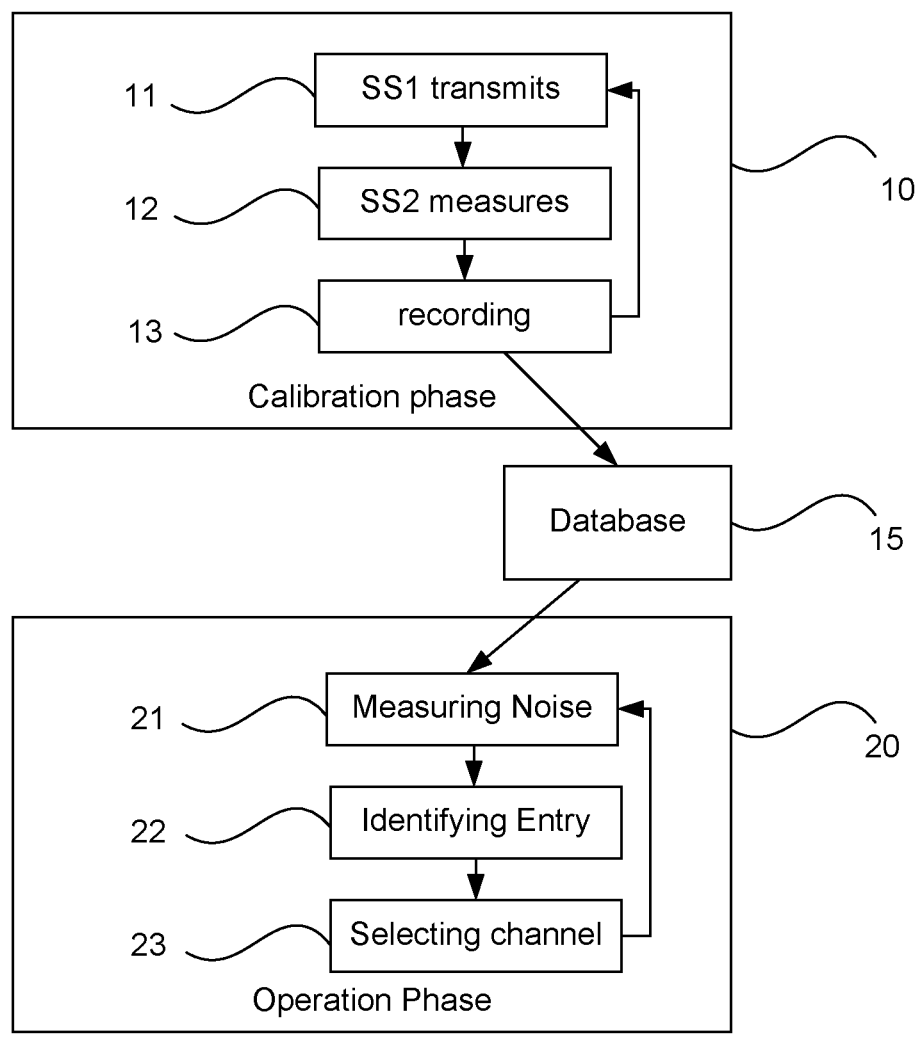

The invention relates to Interference reduction for multi-mode radiocommunication systems. More specifically, the invention relates to method and system for interference reduction for devices comprising at least two different subsystems which use different technologies for signal transmission and reception. Such systems are also called multimode devices, because they have the capability of transmitting and receiving using various wireless data transmission technologies. Such systems use various radio access technologies (RAT).

Any multi-mode device operates in noisy RF (Radio Frequency) environment. This RF (Radio Frequency) noise is generated by a collection of sources, including other surrounding terminals, the self-interference generated by the device itself, or eventually surrounding access points.

A typical application is the case of a mobile router with WiFi access point capability and cellular technology embedded inside (LTE, WiMAX or any 3G technology).

Although sometimes two standards for communication may use the same or similar frequencies, the RAT or communications protocol, between a mobile communications device and a radio infrastructure that gives access to a certain communications network, is different, and consequently, a mobile user or mobile communications device has a need to take into account the interferences which are generated by the use of various RATs in order to receive and transmit data efficiently.

2. PRIOR ART SOLUTIONS

Solutions for correcting interferences (noises) have been widely investigated in the past years. Indeed, correction of interferences is a necessity for decoding correct information, it is important to have a clean signal which allows an efficient processing.

Among various solutions, the use of software is often proposed. However, co-existence features of software (like synchronization of transmit and receive events between systems) cannot always solve the problem as some subsystems cannot interface at protocol level to ensure that one transmitter will never transmit during the receive slot of the other subsystem.

One other known method for improving the performances is the usage of RF (Radio Frequency) filters. However these RF filters cannot completely suppress the interferences and trigger, in general, a significant increase of the total bill of material for the RF (Radio Frequency) portion of the equipment. Moreover the performances of the filters can also depend on the quality of their integration on the printed circuit board (PCB).

In the frequency band of usage, the rejection can vary significantly. Indeed an RF filter has never a flat rejection. The rejection varies over frequency and some bounces can be seen.

Here are some parameters that have a direct impact on the interference levels:
- the filter rejection—that varies over frequency (see above);
- the isolation of the antennas of the two RF (Radio Frequency) systems. In the multi mode device each RF system has one or several antennas. The isolation between these antennas has an impact on the interference level. Some parameters have an impact on the isolation (distance, polarization, directivity, radiation diagram);
- the phase noise level. The phase noise level has a direct impact on the interference level. Most of the time, the acceptable interference level is specified as "out of band" emission. These emissions are caused by phase noise, power amplifier gain and spurious generated by the transmitter.

These parameters are frequency dependent. All of these parameters can also vary from board to board due to the tolerance of all components used for manufacturing the subsystem and/or the device.

So it means that the best case (for avoiding interferences) is not necessarily to select the channel which is as far away as possible from the one used by the other technology (in the proposed example WiFi vs. Cellular).

Thus, the known techniques do not allow avoiding interferences in an efficient way.

3. SUMMARY

An aspect of the invention relates to a method for calibrating a signal transmission equipment, said equipment comprising at least two signal transmission subsystems, a first subsystem implementing a first signal transmission technology and a second subsystem implementing a second signal transmission technology. According to the invention said method comprises a calibration phase comprising:
- a step of transmitting, by said first subsystem, a signal in a predetermined transmission channel and at a predetermined transmission power;
- a step of measuring, by said second subsystem, an amount of noise perceived on at least one channel associated with said second subsystem;
- a step of recording, in a data structure, said amount of noise for said at least one associated channel.

According to a specific embodiment, said calibration phase is implemented in an iterative process comprising several iterations and characterized in that said predetermined transmission channel changes at each new iteration.

The invention also relates to a method of selecting a transmission channel for transmitting a signal, by a subsystem of a signal transmission equipment, said equipment comprising at least two subsystems signal transmission, a first subsystem implementing a first signal transmission technology and a second subsystem implementing a second signal transmission technology. According to the invention said method comprises:
- a step of identifying, in a data structure, an entry associated with an amount of noise previously measured for said first subsystem and delivering at least one usable channel associated for said second subsystem;
- a step of selecting one channel for transmitting said signal among at least one usable channel previously identified.

According to a specific embodiment, said method comprises:
- at least one step of measuring, by said second subsystem, an amount of noise perceived on at least one channel, delivering at least one measure of surrounding noise;
- a step of merging said at least one measure of surrounding noise in said data structure, delivering an updated data structure; and wherein
- said step of identifying an entry associated with said amount of noise and delivering at least one usable channel associated for said second subsystem is made in said updated data structure.

The invention also relates to an apparatus for calibrating a signal transmission equipment, said equipment comprising at least two signal transmission subsystems, a first subsystem implementing a first signal transmission technology and a second subsystem implementing a second signal transmission technology. According to the invention said apparatus comprises calibration means comprising:

- a transmitter for transmitting, by said first subsystem, a signal in a predetermined transmission channel and at a predetermined transmission power;
- a sensor for measuring, by said second subsystem, an amount of noise perceived on at least one channel associated with said second subsystem;
- a recorder for recording, in a data structure, said amount of noise for said at least one associated channel.

The invention also relates to a an apparatus of selecting a transmission channel for transmitting a signal, by a subsystem of a signal transmission equipment, said equipment comprising at least two subsystems signal transmission, a first subsystem implementing a first signal transmission technology and a second subsystem implementing a second signal transmission technology. According to the invention, said apparatus comprises:

- an inspector module for identifying, in a data structure, an entry associated with an amount of noise previously measured for said first subsystem and delivering at least one usable channel associated for said second subsystem;
- a channel selector for selecting one channel for transmitting said signal among at least one usable channel previously identified.

The invention also relates to a computer program product downloadable from a communications network and/or stored on a computer-readable support and/or executable by a microprocessor, said computer program product comprising program code instructions for implementing a method for calibrating a signal transmission equipment, said equipment comprising at least two signal transmission subsystems, a first subsystem implementing a first signal transmission technology and a second subsystem implementing a second signal transmission technology.

According to the invention said computer program product comprising program code instructions for processing at least one iteration of the following steps:

- a step of transmitting, by said first subsystem, a signal in a predetermined transmission channel and at a predetermined transmission power;
- a step of measuring, by said second subsystem, an amount of noise perceived on at least one channel associated with said second subsystem;
- a step of recording, in a data structure, said amount of noise for said at least one associated channel.

The invention also relates to a computer program product downloadable from a communications network and/or stored on a computer-readable support and/or executable by a microprocessor, said computer program product comprising program code instructions for implementing a method of selecting a transmission channel for transmitting a signal, by a subsystem of a signal transmission equipment, said equipment comprising at least two subsystems signal transmission, a first subsystem implementing a first signal transmission technology and a second subsystem implementing a second signal transmission technology.

According to the invention, said computer program product comprising program code instructions for processing at least one iteration of the following steps:

- a step of identifying, in a data structure, an entry associated with an amount of noise previously measured for said first subsystem and delivering at least one usable channel associated for said second subsystem;
- a step of selecting one channel for transmitting said signal among at least one usable channel previously identified.

4. BRIEF DESCRIPTION OF THE DRAWINGS

The proposed method is described in the following by way of examples in connection with the accompanying figures without limiting the scope of the protection as defined by the claim. The figures show:

FIG. 1 shows the mains steps of the method according to the disclosure

Figure 2:
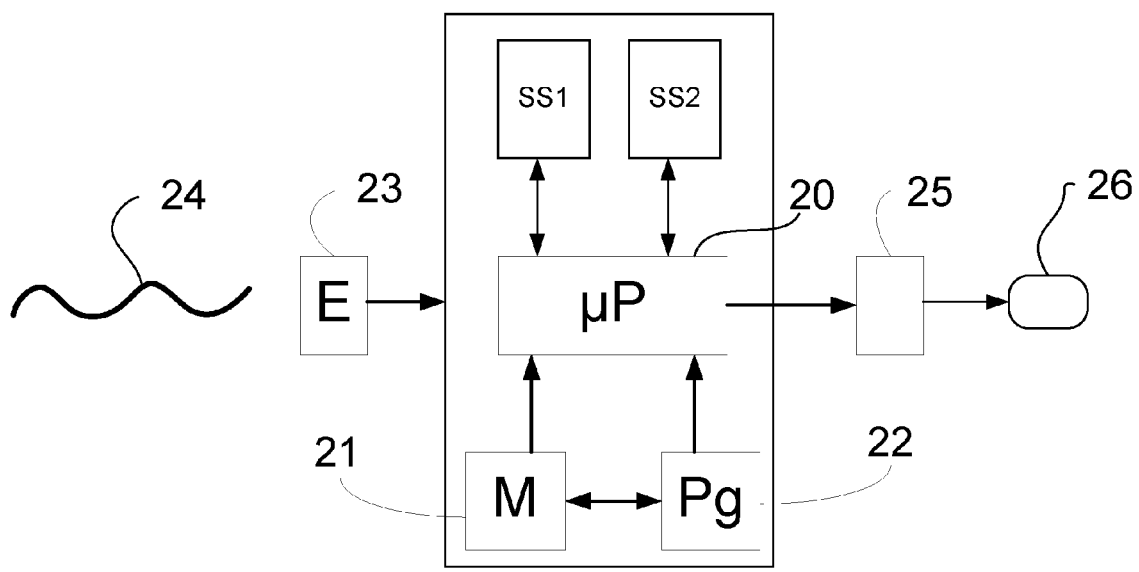

FIG. 2 describes a schematically embodiment of an apparatus for implementing the method of the disclosure.

5. DETAILED DESCRIPTION OF THE INVENTION

5.1 Principles of the Invention

The disclosure enables measuring and calibrating parameters that have a direct impact on the interference levels over frequency and identify the best channels to be used during operation in order to improve the performances. The parameters can be for example: antenna isolation, noise level, filter rejection etc. . . . .

The proposed technique allows reducing interferences in a multi-mode device using several RATs (Radio Access Technologies).

As previously exposed, in at least on embodiment, the technique allows measuring, before the device is in operational conditions (e.g. before it is in use), during a calibration phase, a quantity of noise which is received by a second subsystem of the devise when the first subsystem of the device emits a signal at a predetermined power.

Indeed, the invention makes sense when it is possible to measure a noise in the subsystem and also when at least one of the two systems can select itself the channel to be used. Indeed, for cellular technology the channel is chosen by the network and base station. Usually, the device cannot change the channel based on its own measurements only. In the following explanations, we will call this RF system (i.e. the subsystem that can select itself the channel to be used: SS2, subsystem 2).

In a first embodiment, the predetermined power is the maximum power that the tested subsystem is able to transmit. However, in a second embodiment, various emitting powers are tested (including the maximum power). In this second embodiment, it is possible to make a more accurate analysis of the produced interferences and to decide of the frequency to use in view of the characteristics of the interference.

The results of the measured noise (associated with a given channel) are stored in a data structure. This data structure can be a complex structure file or a database file. In a simpler embodiment, this data structure is a simple flat file which is built during the test phase. In practical use, RF systems almost always store calibration data during manufacturing to ensure the accurate output power, frequency correction . . . . In that case, the noise level is just an additional parameter to be stored in an existing database or file.

After this calibration phase is processed, during operation of the device (e.g. during the use of the device), the noise is measured (by the second RF_2 system) and the subsystem (of the device) which is perturbed by this noise use the most appropriate channel for emitting and receiving.

The data structure which is used is then read during operation if the device for determining which channel should be used in view of the quantity of noise measured during operation. Thus, the subsystem which suffers of the noise is able to choose the most appropriate channel for emitting.

The main principles of the disclosed methods are briefly described in relation with FIG. 1.

In a first phase (10), called calibration phase, the device (DUT) which comprises at least two subsystems SS1 and SS2 (as already mentioned a subsystem according to this disclosure is a system which is able to transmit and receive data using a predetermined technique, for example WiFi, Wimax, LTE, 2G, 3G) is activated (101). Then, one of the two subsystems (for example SS1) receives a command for emitting in several pre-defined channels (lowest, middle, highest channel). The selection of these channels can vary depending on the RF system, the bandwidth (BW) and the design.

The choice has to be made during the characterization of the system to look at the worst case frequencies. It is recalled that the SS1 system cannot select the channel in normal operation (channel is selected by network).

The SS2 system (which is able to select its channel of operation) then measures the noise in each of its channel and for each channel of SS1 during the test phase. All noise levels are stored but a difference for each channel of SS1 is not made in this embodiment (as the SS2 never knows which channel of SS1 will be finally used during operation).

More specifically, in this calibration phase (10), the method comprises:
  a step of transmitting (11), by said first subsystem (SS1), a signal in a predetermined transmission channel and at a predetermined transmission power;
  a step of measuring (12), by said second subsystem (SS2), an amount of noise perceived on at least one channel associated with said second subsystem;
  a step of recording (13), in a data structure (15), of said amount of noise and said at least one associated channel.

This calibration phase can be a standalone phase or an iterative phase, which is implemented several times, for example for every channel that can be used by the first subsystem or only a part of the channel.

The method which is employed for measuring the quantity of noise depends on the used technique for transmitting/receiving data (for example, the method for measuring wifi is different from the method for measuring TDD systems).

In a second phase (20), called operating phase, the device is able to access the data structure, in which the testing results are stored, for determining, in view of a current measured noise, the more appropriate channel to use.

More specifically, in this operating phase, the method comprises:
  a step of identifying (22), in the data structure (15), an entry associated with an amount of noise previously measured for said first subsystem and delivering at least one usable channel associated for said second subsystem;
  a step of selecting (23) one channel for transmitting said signal among at least one usable channel previously identified.

This embodiment of the operating phase is called static embodiment because it only uses the measures made during the calibration phase.

A second embodiment can also be implemented. In this second embodiment, the operating phase comprises a step of measuring, by said second subsystem, an amount of noise perceived on at least one channel, delivering at least one measure of surrounding noise and a step of merging said at least one measure of surrounding noise in said data structure, delivering an updated data structure.

The selection step is made on the entries of the updated data structure.

More specifically, when the device is powered up, SS2 measured the noise level in every channel (SS1 is turned off). Then a new table is created and compared with the table filled during the calibration phase (10). The two tables are merged together taking for each channel the maximum noise value.

This second phase is more efficient for a device that is not in high mobility situation (meaning that the surrounding RF environment does not vary a lot). Depending on the configuration, the device can decide to perform second phase later to adjust the computation of surrounding noise level. Of course it can be done only when SS1 is in "idle" phase (no transmit).

Then SS2 selects the best channel. This selection (or choice) is made by reading the content of the data structure and deciding, in view of the measured noise, which is the appropriate channel (i.e. the channel which is the less sensible to this noise) to use (i.e the channel with the lowest noise level (coming from the "merged" table))

Thus, the disclosure comprises two different methods: the first one (calibration phase) is used for recording results of tests for forming an "operational base", the second one (operational phase) uses the "operational base" when the device is in operation.

These methods are of great help when a noise problem occurs. Indeed, the proposed methods solve at least three problems:
1. it avoids implementing expensive and voluminous components for realizing a noise cancellation module. Costless components can be used since the noise is minimized by choosing an appropriate channel;
2. it reduce size of the subsystem, because it is useless searching for cancelling an important noise since, by definition, this noise is not present or is weak;
3. the disclosed method allows building a kind of fingerprint of the device. Indeed, it is know that intensive and inexpensive build of cheap devices is possible because cheap component are used. Thus, it is also known those cheap components are not always "stable" (e.g. the behavior of the component is not always guaranteed and the "tolerances" are highly used for "quality control passing" of the device). Consequently, the behavior of sets of devices may highly vary. Thus, the disclosed method, by using a calibration phase, allows taking into account of the behavior of the device (i.e. of the behavior of the components which have been used for building the device) during the operation phase.

Another interesting feature of the method is that, the stored information can also be used when an external noise is measured. Indeed, the selection of the appropriate channel can be done with any measured noise, not only for noise measured for the other subsystem. This means that if another device is used near the device which incorporates means for implementing the disclosed method, the latter is able reading the data structure (or an updated data structure) for selecting the appropriate channel.

Thus, as it can be easily understand, the common inventive characteristic which links the calibration phase and the operating phase, as previously disclosed, is the data structure containing the results of the tests. The calibration phase is a factory process which is operated after the device is built, and before it is packaged and stored.

In the following, a specific embodiment of the disclosure is presented. Of course, the invention is not limited to this specific embodiment and can be used in various situation and/or various domains where the characteristics of the invention can be considered as important or useful.

5.2 Description of an Embodiment

In this embodiment, a device comprising two transmission/reception subsystems is used. Of course, the proposed method can also be applied to devices which comprise more than two transmission/reception subsystems. In such a case, it is only necessary to mix the iterative calibration phase by using alternatively or simultaneously the subsystem for determining the usable channel in view of the measured noise.

In this embodiment, called "static embodiment" (versus a complementary "dynamic embodiment" which is presented below), the device includes two RF (Radio Frequency) systems which are called SS1 and SS2. Subsystem SS2 can manage its own frequency selection (Subsystem SS2 acts as an access point).

During the manufacturing, a final Over the Air (OTA) test is done for ensuring proper behavior of the device: this is the "calibration phase". During this calibration phase, several operations occur. In a first operation (stage), in this specific embodiment, the Subsystem SS1 transmits at maximum output power in the closest usable channel of Subsystem SS2 (i.e. the channel which has the closest frequency of the channel use by subsystem 2).

In the same time, the Subsystem SS2 measures (rates) the noise level in its receiver in every SS2 usable channel.

For each usable channel of Subsystem SS2, a record in a flat table is filled and the noise level recorded. Thus, this calibration phase comprises an iterative recordation process. During this operation (of the subsystem SS1 which transmits at maximum output power in the closest usable channel of Subsystem SS2) the Subsystem SS2 test one channel after the other and record associated noise, as long as some channel remains not tested.

Then, during normal operation, the Subsystem SS2 selects its preferred channel of operation based on these recorded measurements.

According to an additional feature of the method, the reverse method also applies from Subsystem SS2 to Subsystem SS1. As the Subsystem SS2 can select its own channel, the device can transmit in every channel and the Subsystem SS1 records the noise level and store the information in a table (this table can be the same as previously, and the recording can be made in a specific row of the table, as explained in the example below). Then, according to this specific additional feature, the Subsystem SS2 creates another table (or another row) with its output power level. In other words, in this specific additional feature there is:

- a step of transmitting, by said second subsystem, a signal in a predetermined transmission channel and at a predetermined transmission power;
- a step of measuring, by said first subsystem, an amount of noise perceived on at least one channel associated with said first subsystem;
- a step of recording, in a data structure, said amount of noise for said at least one associated channel.

Then finally a table is filled including noise level in Subsystem SS1 and output power level of Subsystem SS2 for such noise level. Thus, the noise level (and the corresponding channel) will be selected to keep the best performance of Subsystem SS1.

Below is an example of a table in the case of Wifi (same channel size for each channel) and LTE band 41 (TDD 2.5 GHz) device, where:

Column (3) is the noise level received when LTE band 41 transmits in its lowest frequency channel (at a predetermined power level), assuming that the band is the worst case for receiving in SS2 system;

Column (4) is the noise level received by LTE band 41 lowest channel when wifi transmits; In other embodiment, there can have as much column (4) as the number of channel which are likely to be used by subsystem 1.

| Channel | Frequency | (3) | (4) |
|---------|-----------|-----|-----|
| 1 | 2,412 MHz | x1 | y1 |
| 2 | 2,417 MHz | x2 | y2 |
| 3 | 2,422 MHz | x3 | y3 |
| 4 | 2,427 MHz | x4 | y4 |
| 5 | 2,432 MHz | x5 | y5 |
| 6 | 2,437 MHz | x6 | y6 |
| 7 | 2,442 MHz | x7 | y7 |
| 8 | 2,447 MHz | x8 | y8 |
| 9 | 2,452 MHz | x9 | y9 |
| 10 | 2,457 MHz | x10 | y10 |
| 11 | 2,462 MHz | x11 | y11 |
| 12 | 2,467 MHz | x12 | y12 |
| 13 | 2,472 MHz | x13 | y13 |
| 14 | 2,484 MHz | x14 | y14 |

The "x . . .", and "y . . ." are the various noise values which are stores in the table.

Once this calibration phase is finished, the device is packaged and stored.

According to a specific feature of the method, at the startup of the product (i.e. when the device is in use), the device will then select the channel and the output power that maximize the performances (highest output power of Subsystem SS2 keeping noise in Subsystem SS1 (cellular subsystem, which cannot choose its own frequency) below a predefined threshold.

According to a specific embodiment, this predefined threshold is the sensibility level of the receiver (of Subsystem 1). According to another specific embodiment, this predetermined threshold can be up to 3 dB upper than the sensibility level of the receiver (of Subsystem 1).

According to another embodiment, there as many columns (3) as channel (which relates to other channels than band 41 (in the case of LTE for example)).

Indeed, the inventors have had the idea to add a threshold for determining an acceptable level of noise (or interference), which is acceptable for one subsystem relatively to the other. Thus, it is possible, not only to select the lower noise level, but also to select the noise level which is adapted in view of the noise level that can be processed (for example by software) by component of the impacted subsystem (i.e. the subsystem SS2 is impacted by the noise produced by the subsystem SS1 and vice versa).

In this embodiment, the identification of the usable channel is done, firstly by selecting, among the various entries of the table, a first subset of channel in which the values of column (4) is below the predetermined threshold. Secondly, among the first subset, selecting one channel for transmitting said signal among at least one usable channel is done by selecting the channel in which the value of column (3) is the lowest.

5.3 Dynamic Method

In another embodiment, a dynamic method is applied. Indeed, the interference level depends also on the external conditions and possible surrounding interferers.

In this embodiment of the method, at the startup of the product, the access point (i.e. SS2 in the previous example) measures the noise level in each possible channel. With the measurements, a second table is filed (or a specific column of the first table). This second table (or specific column of the first table) is a complementary of the first table. The levels of interferences depend on surrounding device, position of the product, antenna etc.

Based on these results and based on the table obtained using the "static" method (i.e. the testing method), the product decides the best channel to be used, i.e. the channel with the lowest interference or noise level.

Below is an example of a table in the case of Wifi (same channel size for each channel) and LTE band 41 (TDD 2.5 GHz) device, where:

Column (3) is the noise level received when LTE band 41 transmits in its lowest frequency channel, assuming that this band is the worst case for receiving in ss2 system;

Column (4) is the noise level received by LTE band 41 lowest channel when wifi transmits; In other embodiment, there can have as much column (4) as the number of channel which are likely to be used by subsystem 1.

The new column (5) is the surrounding noise level (assuming device is powered ON), which is measured.

| Channel | Frequency | (3) | (4) | (5) |
|---|---|---|---|---|
| 1 | 2,412 MHz | x1 | y1 | z1 |
| 2 | 2,417 MHz | x2 | y2 | z2 |
| 3 | 2,422 MHz | x3 | y3 | z3 |
| 4 | 2,427 MHz | x4 | y4 | z4 |
| 5 | 2,432 MHz | x5 | y5 | z5 |
| 6 | 2,437 MHz | x6 | y6 | z6 |
| 7 | 2,442 MHz | x7 | y7 | z7 |
| 8 | 2,447 MHz | x8 | y8 | z8 |
| 9 | 2,452 MHz | x9 | y9 | z9 |
| 10 | 2,457 MHz | x10 | y10 | z10 |
| 11 | 2,462 MHz | x11 | y11 | z11 |
| 12 | 2,467 MHz | x12 | y12 | z12 |
| 13 | 2,472 MHz | x13 | y13 | z13 |
| 14 | 2,484 MHz | x14 | y14 | z14 |

The "x . . .", "y . . ." and "z . . ." are the various noise values which are stores in the table.

In this embodiment, the identification of the usable channel is done, firstly by selecting, among the various entries of the table, a first subset of channel in which the values of column (4) is below the predetermined threshold. Secondly, among the first subset, selecting one channel for transmitting said signal among at least one usable channel is done by selecting the channel in which the value of the sum of column (3) and column (5) is the lowest. This is what is called the "merging" in the merging said at least one measure of surrounding noise in said data structure, delivering an updated data structure. In this embodiment, the values are not really merged: a new column is added in the data structure for storing the values of the surrounding noise. However, in other embodiment, a merging can be realized, which delivers a single updated column (3).

Furthermore, in this embodiment the merge is realized by summing the values (the sum of the value of column (3) and column (5) is done). However, in other embodiment, other operation can be done, in function of specific parameters. For example, it is possible to realize a mean of the two values. It is also possible to weight the values in view of specific purposes.

5.4 Other Features

The structure of an apparatus for the execution of the presented methods is illustrated schematically in FIG. 2. It comprises a memory M 21, and a processing unit 20 equipped with a microprocessor μP, that is driven by a computer program (or application) Pg 22. It also comprises a first transmission subsystem (SS1) and a second transmission subsystem (SS2). At input, the processing unit 20 receives signal 24 through a network input interface module E 23. The microprocessor μP processes signal 24 according to the instructions of the program Pg 22, to measure noises 26 which will be recorded through an interface module S 25. The apparatus can be included in a mobile station. It can be implemented as a specific chip or integrated in a preexistent chip.

In this embodiment, the apparatus comprises:
- a transmitter for transmitting, by said first subsystem, a signal in a predetermined transmission channel and at a predetermined transmission power;
- a sensor for measuring, by said second subsystem, an amount of noise perceived on at least one channel associated with said second subsystem;
- a recorder for recording, in a data structure, said amount of noise for said at least one associated channel.

The same structure can also be implemented for the apparatus which select the best channel in view of the measures previously done. In this embodiment, the apparatus thus comprises:
- an inspector module or a scheduler for identifying, in a data structure, an entry associated with an amount of noise previously measured for said first subsystem and delivering at least one usable channel associated for said second subsystem;
- a channel selector for selecting one channel for transmitting said signal among at least one usable channel previously identified.

Although the present disclosure has been described with reference to one or more examples, workers skilled in the art will recognize that changes may be made in form and detail without departing from the scope of the disclosure and/or the appended claims.

The invention claimed is:

1. A method of selecting a transmission channel for transmitting a signal, by a subsystem of signal transmission equipment, said equipment comprising at least two signal transmission subsystems, a first subsystem implementing a first signal transmission technology and a second subsystem implementing a second signal transmission technology, said method comprising:
  during a calibration phase:
    at least one measuring, by said second subsystem, an amount of noise perceived on at least one channel, delivering at least one measure of surrounding noise;
    merging said at least one measure of surrounding noise in a data structure, delivering an updated data structure;
  and, after said calibration phase:
    identifying, in said updated data structure, an entry associated with an amount of noise, for said first subsystem and delivering at least one usable channel associated for said second subsystem; and
    selecting one channel for transmitting said signal among at least one usable channel previously identified.

2. The method according to claim 1, wherein said calibration phase comprises:
  transmitting, by said first subsystem, a signal in a predetermined transmission channel and at a predetermined transmission power;
  and
  after the at least one measuring, recording, in said data structure, said amount of noise for said at least one channel associated with the second subsystem.

3. The method according to claim 2, wherein said calibration phase is implemented in an iterative process comprising several iterations and wherein said predetermined transmission channel changes at each iteration.

4. An apparatus of selecting a transmission channel for transmitting a signal, by a subsystem of signal transmission equipment, said equipment comprising at least two signal transmission subsystems, a first subsystem implementing a first signal transmission technology and a second subsystem implementing a second signal transmission technology, said apparatus comprising:
- a calibration module configured to perform the following acts during a calibration phase:
  - at least one measuring, by said second subsystem, an amount of noise perceived on at least one channel, delivering at least one measure of surrounding noise;
  - merging said at least one measure of surrounding noise in a data structure, delivering an updated data structure;
- an inspector module configured to identify, in said updated data structure after said calibration phase, an entry associated with an amount of noise, for said first subsystem and delivering at least one usable channel associated for said second subsystem; and
- a channel selector configured to select one channel for transmitting said signal among at least one usable channel previously identified.

5. A computer-readable memory comprising a computer program product stored thereon and executable by a microprocessor, said computer program product comprising program code instructions for implementing a method of selecting a transmission channel for transmitting a signal, by a subsystem of signal transmission equipment, said equipment comprising at least two signal transmission subsystems, a first subsystem implementing a first signal transmission technology and a second subsystem implementing a second signal transmission technology, wherein said computer program product comprises program code instructions for processing at least one iteration of the following:
- during a calibration phase:
  - at least one measuring, by said second subsystem, an amount of noise perceived on at least one channel, delivering at least one measure of surrounding noise;
  - merging said at least one measure of surrounding noise in a data structure, delivering an updated data structure;
- and, after said calibration phase:
  - identifying, in said updated data structure, an entry associated with an amount of noise, for said first subsystem and delivering at least one usable channel associated for said second subsystem; and
  - selecting one channel for transmitting said signal among at least one usable channel previously identified.

* * * * *